(12) United States Patent
Imai et al.

(10) Patent No.: US 11,251,490 B2
(45) Date of Patent: Feb. 15, 2022

(54) BATTERY MODULE AND VEHICLE EQUIPPED WITH SAME

(71) Applicant: SANYO Electric Co., Ltd., Daito (JP)

(72) Inventors: Kenichi Imai, Hyogo (JP); Shingo Ochi, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 87 days.

(21) Appl. No.: 16/635,007

(22) PCT Filed: Jul. 18, 2018

(86) PCT No.: PCT/JP2018/026897
§ 371 (c)(1),
(2) Date: Jan. 29, 2020

(87) PCT Pub. No.: WO2019/039139
PCT Pub. Date: Feb. 28, 2019

(65) Prior Publication Data
US 2020/0243815 A1  Jul. 30, 2020

(30) Foreign Application Priority Data

Aug. 21, 2017 (JP) .............................. JP2017-158454

(51) Int. Cl.
| | |
|---|---|
| H01M 50/20 | (2021.01) |
| H01M 10/647 | (2014.01) |
| F16B 5/02 | (2006.01) |
| F16B 19/02 | (2006.01) |
| H01M 10/04 | (2006.01) |
| H01M 50/10 | (2021.01) |

(52) U.S. Cl.
CPC .............. *H01M 50/20* (2021.01); *F16B 5/02* (2013.01); *F16B 19/02* (2013.01); *H01M 10/0413* (2013.01); *H01M 10/647* (2015.04); *H01M 50/10* (2021.01); *H01M 2220/20* (2013.01)

(58) Field of Classification Search
None
See application file for complete search history.

(56) References Cited

U.S. PATENT DOCUMENTS

2013/0273404 A1  10/2013  Ochi et al.
2017/0141367 A1  5/2017  Kim et al.

FOREIGN PATENT DOCUMENTS

| JP | 2012-256466 A | 12/2012 |
| JP | 2013-222554 A | 10/2013 |
| JP | 2015-11819 A | 1/2015 |
| JP | 2015-210971 A | 11/2015 |
| JP | 2017-142942 A | 8/2017 |
| WO | 2012/057322 A1 | 5/2012 |
| WO | 2014/024432 A1 | 2/2014 |

OTHER PUBLICATIONS

International Search Report dated Oct. 9, 2018, issued in counterpart Application No. PCT/JP2018/026897 (2 pages).

*Primary Examiner* — Wyatt P McConnell
(74) *Attorney, Agent, or Firm* — Westerman, Hattori, Daniels & Adrian, LLP

(57) ABSTRACT

A pair of end plates disposed respectively at end faces of a battery stack are connected by bind bars and apply pressure to the battery stack to immobilize the battery stack. Each of the end plates includes a locking hole extending along a surface of the end plate. The end plate is fixed to a base plate by a fixing bolt inserted through the locking hole. The locking hole includes a deformation space that allows deformation of the fixing bolt when cell reaction force of the battery stack is caused.

11 Claims, 14 Drawing Sheets

BATTERY MODULE AND VEHICLE EQUIPPED WITH SAME

TECHNICAL FIELD

The present invention relates to a battery module including end plates that are connected by bind bars respectively at ends of a battery stack and are each fixed to a base plate, such as a chassis of a vehicle, by means of fixing bolts passed through the end plate along a surface of the end plate. The present invention also relates to a vehicle including this battery module.

BACKGROUND ART

A typical battery module includes a battery stack including a plurality of prismatic battery cells, a pair of end plates disposed respectively at end faces of the battery stack, and bind bars connecting the pair of end plates (refer to PTL 1). The battery stack of this battery module is bound by the end plates and the bind bars, so that expansion of the prismatic battery cells of the battery stack can be suppressed. In cases where this battery module is mounted to a vehicle or the like, the end plates are each fixed to a chassis of the vehicle by means of fixing bolts that are passed through the end plate along a surface of the end plate for the purpose of preventing binding parts from coming loose when the prismatic battery cells expand during charge and discharge, or when the battery module experiences vibration, impact and others from the vehicle running.

CITATION LIST

Patent Literature

PTL 1: International Publication No. WO 2012/057322

SUMMARY OF THE INVENTION

Technical Problem

On the other hand, with recent demand for a battery module having a higher energy density per volume and a higher energy density per weight, even prismatic battery cells having a higher energy density per volume and a higher energy density per weight are desirably adopted for a battery module. When having the higher energy density per volume and the higher energy density per weight, the prismatic battery cells tend to experience a great dimensional change associated with charge and discharge or degradation. In order to suppress expansion of the prismatic battery cells that experience a great dimensional change associated with charge and discharge or degradation, the prismatic battery cells need to be bound together with relatively great force. In the structure having each end plate fixed to the chassis of the vehicle by means of the fixing bolts that are passed through the end plate along the surface of the end plate, expansion of the prismatic battery cells causes cell reaction force to act on the end plate and to thus cause a load on the fixing bolts. Therefore, also needed is a measure against shear force that acts on each of the fixing bolts.

The present invention has been developed for the purpose of solving the above drawback, and one object of the present invention is to provide a technique that reduces shear force which is caused by cell reaction force to act on a fixing bolt, with a very simple structure that is small-sized and lightweight as a whole and can be mass-produced at low cost.

Solution to Problem

A battery module according to an aspect of the present invention includes a battery stack that includes a plurality of prismatic battery cells stacked in a direction along their thicknesses, a pair of end plates disposed respectively at end faces of the battery stack, a bind bar 4 connecting the pair of end plates, and a fixing bolt fixing each of the pair of end plates to a base plate. Each of the pair of end plates includes a locking hole for the fixing bolt, and a locking hole extends along a surface of each of the pair of end plates. The locking hole includes, on a battery side of the locking hole, a deformation space that allows deformation of the fixing bolt when cell reaction force of the battery stack is caused.

A vehicle according to an aspect of the present invention includes the above battery module with the base plate serving as the chassis of the vehicle. Each of the pair of end plates The above structure is very simple, and yet the above structure reduces shear force that acts on the fixing bolt with no special member added and enables weight reduction of the bolt. Characteristically, the above structure can also be smaller in size as a whole and can be mass-produced at low cost. The end plate of the above battery module is formed with the locking hole including the deformation space and is fixed by the fixing bolt inserted through the locking hole. Therefore, while being fixed to the base plate, the end plate can be displaced by increased cell reaction force. By virtue of the displacement of the end plate, expansion of the battery cells is permitted, and the cell reaction force decreases. Accordingly, the fixing bolt is acted upon by reduced shear force.

DESCRIPTION OF EMBODIMENTS

Figure 14:
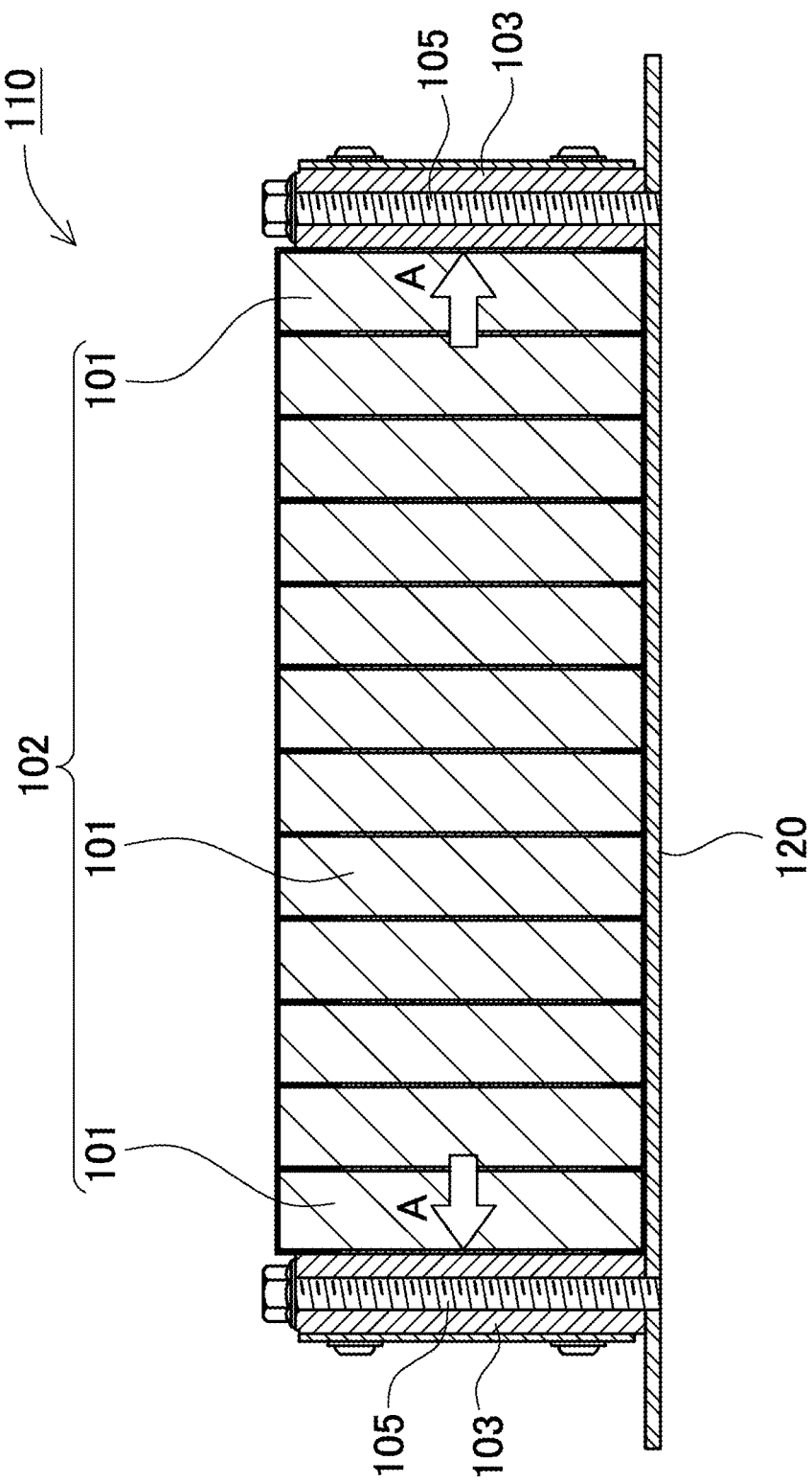
FIG. 14 is a vertical, longitudinal section schematically illustrating a conventional battery module.

A description is provided first of a point on which the present invention focuses. A battery module including a plurality of prismatic battery cells has end plates disposed respectively at end faces of a battery stack that includes the plurality of stacked prismatic battery cells. The pair of end plates are connected by bind bars, so that the battery stack is immobilized with pressure being applied to the battery stack in a stacked direction. Each of the end plates of this battery module is fixed to, for example, a chassis of a vehicle by means of fixing bolts that are passed through the end plate along a surface of the end plate for the purpose of preventing binding parts from coming loose when the prismatic battery cells expand during charge and discharge, or when the battery module experiences vibration, impact, and others. FIG. 14 is a sectional view illustrating an example in which battery module 110 is fixed to base plate 120. During charge and discharge, prismatic battery cells 101 of battery module 110 fixed to base plate 120 expand, thus applying pressure to an inner surface of each of end plates 103. Each end plate 103 is pressed at its inner surface by expanding battery stack 102, thus experiencing, from a direction indicated by arrow A, cell reaction force that is proportional to a product of an area of battery stack 102 and pressing force of battery stack 102. Therefore, those prismatic battery cells 101 experiencing a great dimensional change associated with, for example, the charge and discharge cause the cell reaction force as great as their expansion to act on end plates 103. The cell reaction force that acts on end plates 103 is, for example, as extremely great as several tons in battery module 110 which is used as a power source to drive a traction motor of a vehicle. Such extremely great cell reaction force acts on end plates 103 in directions that stretch bind bars (not illustrated). The cell reaction force acting in these directions causes each end plate 103 to move along a stacked direction of prismatic battery cells 101. Each end plate 103 is fixed to base plate 120 by fixing bolts 105 that are passed through end plate 103 along a surface of end plate 103, so that the extremely great cell reaction force acts as shear force on fixing bolts 105 when acting on end plate 103. Because the cell reaction force acting on end plate 103 is extremely great, the shear force acting on fixing bolts 105 is also extremely great. Therefore, in order to withstand the extremely great shear force, battery module 110 needs to use an increased number of fixing bolts 105 or fixing bolts 105 each having an increased bolt diameter, or needs to have end plates 103 each having an increased thickness. This requires that battery module 110 have a larger outline and a weight increase, thus detrimentally making weight reduction and cost reduction that are crucial to battery module 110 difficult to achieve.

A battery module according to an aspect of the present invention includes battery stack 2 that includes a plurality of prismatic battery cells 1 stacked in a direction along their thicknesses, a pair of end plates 3 applying pressure to battery stack 2 respectively at end faces of battery stack 2 to immobilize battery stack 2, bind bar 4 connecting the pair of end plates 3, and fixing bolt 5 fixing each of the pair of end plates 3 to base plate 20. Each of the pair of end plates 3 includes locking hole 7 for fixing bolt 5, and locking hole 7 extends along a surface of each of the pair of end plates 3. Locking hole 7 includes, on a battery side of locking hole 7, deformation space 8 that allows deformation of fixing bolt 5 when cell reaction force of battery stack 2 is caused.

It is to be noted that "along the surface of the end plate" used in this specification refers to a direction parallel to a principal surface which is a wider surface of the end plate that has a substantially plate-shaped outline.

By including the fixing bolt in the locking hole that includes the deformation space which allows deformation of the fixing bolt when extremely great cell reaction force of the battery stack is caused, the above battery module has optimal transmission or distribution paths for that cell reaction force and significantly reduces shear force that acts on the fixing bolt. While the great cell reaction force presses the end plate in the above structure, the fixing bolt is caused to deform in the locking hole having the deformation space without hitting hard against an inner surface defined by the locking hole. Cell reaction force of the battery stack increases shear force that acts on the fixing bolt and tension of the bind bar. If the bind bar and the end plate are both rigid members that do not deform at all, the cell reaction force can be balanced by tension of the bind bar. Accordingly, the shear force that acts on the fixing bolt can be reduced. However, even if a thick metal plate is used as the bind bar, the bind bar cannot be rigid enough not to deform at all. The bind bar that is not rigid is stretched by the cell reaction force. When an end plate of a conventional battery module is caused to move by stretching of a bind bar, that movement is checked by shear force that acts on a fixing bolt. Therefore, the shear force acting on the fixing bolt is extremely great.

The fixing bolt of the above-described battery module is disposed to be able to deform in the locking hole including the deformation space so that the end plate can be moved when the bind bar stretches. When deformed by cell reaction force in the locking hole, the fixing bolt moves the end plate. When moving, the end plate increases stretching of the bind bar and thus causes the bind bar to have increased tension so that the cell reaction force is balanced with the tension of the end plate. This is because the tension of the bind bar increases in proportion to deformation. Frictional resistance is also caused between the moving end plate and the base plate. The frictional resistance increases in proportion to contact pressure between the end plate and the base plate. By fastening the end plate tightly to the base plate, the fixing bolt increases the frictional resistance. When added together, the bind bar's tension that increases in proportion to deformation caused by the cell reaction force, and the frictional resistance that is strong because of strong contact pressure cause reduced shear force to act on the fixing bolt. This is because the bind bar's tension and the frictional resistance both act in a direction opposite to a direction that the cell reaction force acts. It follows from this that with the cell reaction force being distributed to the bind bar's tension and the frictional resistance in the above-described battery module, the fixing bolt is acted upon by the reduced shear force. The bind bar's tension that is caused by the movement of the end plate, and the frictional resistance that is caused by fastening of the end plate to the base plate are considerably great. The structure that distributes the cell reaction force to the tension and the frictional resistance causes the considerably reduced shear force to act on the fixing bolt. By including the fixing bolt in the locking hole which includes the deformation space to allow deformation of the fixing bolt, the structure can distribute the cell reaction force to the tension and the frictional resistance. With this structure, shear force which acts on the fixing bolt can be reduced significantly to a few tenths. Because the significantly reduced shear force can be caused to act on the fixing bolt, the above-described battery module characteristically does not require many thick bolts and can be reduced in size with the bolts not having a significant effect on its weight.

Locking hole 7A of end plate 3A of a battery module may flaringly increase in size heading toward a leading edge of fixing bolt 5 and may include deformation space 8 near the leading edge of fixing bolt 5. Characteristically, the battery module having this structure enables the fixing bolt to be inserted into position (without being out of position) in the end plate and enables the fixing bolt to be deformed by cell reaction force in the deformation space.

Locking hole 7B of end plate 3B of a battery module may be a long hole that is slender in a stacked direction of battery stack 2 and may include deformation space 8 on a battery side of fixing bolt 5. The battery module having this structure characteristically can have the larger deformation space for the fixing bolt while the end plate has a reduced thickness.

Locking hole 7C of a battery module may have an inside diameter that is larger than an outside diameter of a threaded part of fixing bolt 5. Fixing bolt 5 may include, near its rear edge, engagement (fitting) part 5C of an outside diameter that engages or fits in locking hole 7C. With the engagement part engaging in locking hole 7C, deformation space 8 may be provided near a leading edge of fixing bolt 5. Characteristically, this battery module enables the fixing bolt to be inserted into position (without being out of position) in the end plate and enables the fixing bolt to be deformed, without fail, by cell reaction force in the deformation space.

Locking hole 7D of a battery module may include small diameter part 7a that allows insertion of a rear end of fixing bolt 5, and larger diameter part 7b that allows insertion of a leading end of fixing bolt 5. Threaded part 5B can be disposed into position because of small diameter part 7a, and larger diameter part 7b having a larger inside diameter larger than a diameter of small diameter part 7a, may include deformation space 8. Characteristically, the battery module having this structure enables the fixing bolt to be inserted into position (without being out of position) in the end plate by means of the small diameter part and enables the fixing bolt to be deformed in the deformation space of the larger diameter part.

Locking hole 7E of a battery module may have an inside diameter that is larger than an outside diameter of threaded part 5B of fixing bolt 5 and may include, at its opening, flaringly expanding part 7e increasing in size heading toward the opening. Fixing bolt 5 may include flaring insert 5E guided in flaringly expanding part 7e. Fixing bolt 5 may be inserted into position in locking hole 7E with insert 5E guided in flaringly expanding part 7e. Characteristically, this battery module enables the fixing bolt to be disposed into a fixed position (without being out of position) in the end plate and can reduce shear force by allowing the fixing bolt to be deformed in the deformation space.

Locking hole 7C of a battery module may have an inside shape that is larger than an outside shape of threaded part 5B of fixing bolt 5, and deformation space 8 may be provided between locking hole 7C and threaded part 5B. Deformation space 8 may partly include collar 9 inserted, and collar 9 may have a center hole allowing insertion of threaded part 5B of fixing bolt 5. This battery module enables the fixing bolt to be inserted into position (without being out of position) in the end plate with the deformation space provided in the locking hole.

Locking hole 7C of a battery module may have an inside shape that is larger than an outside shape of threaded part 5B of fixing bolt 5, and deformation space 8 may be provided between locking hole 7C and threaded part 5B. Deformation space 8 may include flexible ring 11 that is inserted and is flexible enough to deform on being pressed by threaded part 5B that is deformed. The battery module having this structure enables the fixing bolt to be inserted into position (without being out of position) in the end plate and enables the fixing bolt to be deformed by cell reaction force in the locking hole.

Locking hole 7F of a battery module may be groove-shaped, may have a battery-side opening and may include deformation space 8 on a battery side of threaded part 5B of fixing bolt 5.

The pair of end plates 3 of the battery module may both include locking holes 7 each including deformation space 8.

A vehicle according to the present invention includes the above battery module. Base plate 20 serves as chassis 92 of the vehicle, and each of the pair of end plates 3 is fixed to chassis 92 by fixing bolt 5.

Exemplary embodiments of the present invention are hereinafter described with reference to the drawings. It is to be noted, however, that the exemplary embodiments described below are illustrations each embodying a technical idea of the present invention, and the present invention is not specifically limited to the following exemplary embodiments. Elements recited in the claims are not specifically limited to those members described in the exemplary embodiments. Unless otherwise specified, particulars including dimensions, materials, shapes, and relative positions of the members described in each of the exemplary embodiments are described as being mere examples and not as being restrictive of the present invention. The sizes, the relative positions, and others of the members may be illustrated exaggeratedly in the drawings for clear explanation. Those members that are identical or of the same quality have the same name and the same reference mark in the following description, and detailed descriptions of those members are omitted where appropriate. A single member may be configured to serve as a plurality of elements of the present invention. On the other hand, a function of a single element of the present invention may be achieved by a plurality of members. Contents described in some examples or some of the exemplary embodiments can be used, for example, in other examples or exemplary embodiments.

Figure 1:
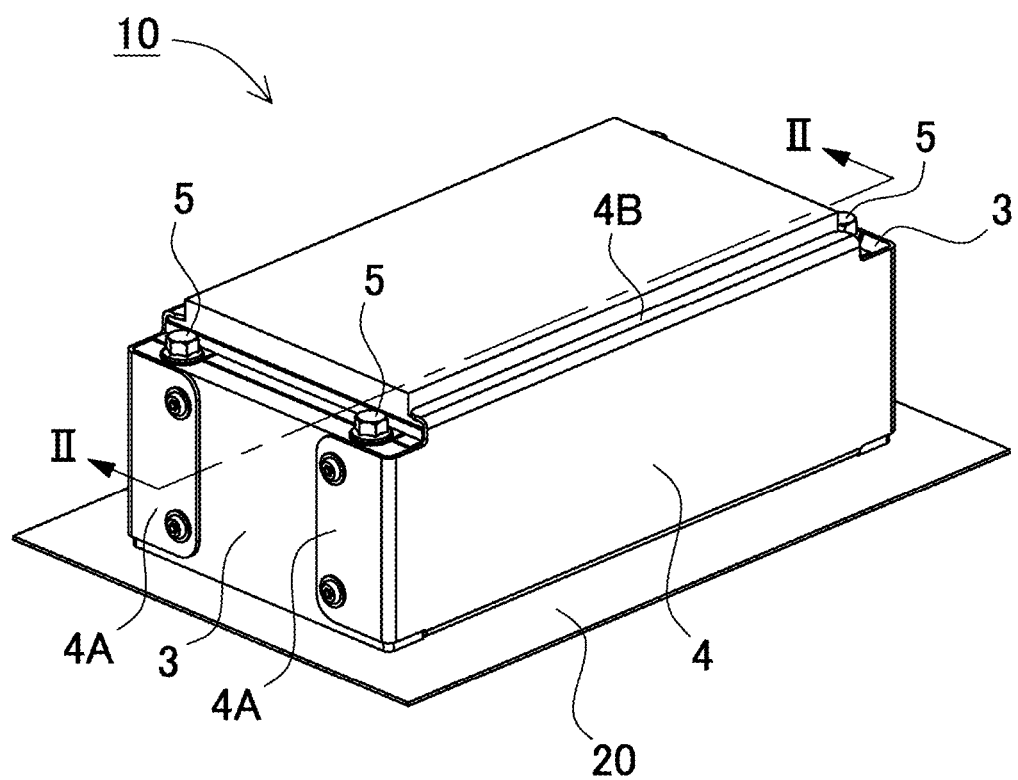
FIG. 1 is a perspective view of a battery module according to an exemplary embodiment of the present invention.

FIG. 1 is a perspective view of battery module 10 according to the exemplary embodiments of the present invention, and FIGS. 2 to 10 are sectional views of battery module 10. Battery module 10 illustrated in each of these drawings includes battery stack 2 that includes a plurality of prismatic (rectangular) battery cells 1 stacked with each of spacers 12 made of insulating material being put between prismatic battery cells 1, a pair of end plates 3 pinching battery stack 2 respectively at end faces of battery stack 2, bind bars 4 binding the pair of end plates 3 together, and fixing bolts 5 fixing end plates 3 to base plate 20. As illustrated in FIG. 1, above battery module 10 has a substantially box-shaped external appearance. The plurality of prismatic battery cells 1 are stacked to form battery stack 2. Battery stack 2 is held by end plates 3 at its end faces facing in a stacked direction, and each of bind bars 4 connects end plates 3 at its ends. Thus battery stack 2 is immobilized or fixed with pressure being applied to battery stack 2. Battery stack 2 has those stacked prismatic battery cells 1 connected in series, in parallel, or in series and parallel via bus bars (not illustrated) that are metal plates.

An exterior can of each of prismatic battery cells 1 has a rectangular outline, has a greater width than its thickness and has an opening closed with a seal plate. The seal plate is provided with a positive and a negative electrode terminal that connect with the bus bars. Battery module 10 having prismatic battery cells 1 connected in series can increase output voltage to increase output, while battery module 10 having prismatic battery cells 1 connected in parallel can increase current capacity. Each of prismatic battery cells 1 is a non-aqueous electrolyte secondary battery such as a lithium-ion rechargeable battery. However, prismatic battery cell 1 may even be any other secondary battery that is currently available, such as a nickel metal hydride battery or a nickel-cadmium battery, or any secondary battery that is to be developed.

Each of end plates 3 is made of aluminum or an aluminum alloy. However, end plate 3 may be made of another metal in place of aluminum or the aluminum alloy or may be a stack of a plastic and a metal plate. As FIG. 1 illustrates, bind bars 4 are screwed to end plate 3 at four corners of an external surface of end plate 3. Insulator 6 is sandwiched between each end plate 3, which is made of the metal, and battery stack 2 to insulate end plate 3 from prismatic battery cell 1.

Provided in end plate 3 are locking holes 7 that each extend, for fixing bolt 5, along a surface of end plate 3 toward base plate 20. Fixing bolt 5 is inserted into locking hole 7 to be passed through end plate 3 along the surface of end plate 3 and fixes end plate 3 to base plate 20. Fixing bolt 5 passed through end plate 3 along the surface of end plate 3 has screw head 5A on one widthwise end face (an upper end face in the drawing) of end plate 3, and a leading end of its threaded part 5B projects from another widthwise end face (a lower end face in the drawing) of end plate 3 and is fixed to base plate 20. FIG. 1 battery module 10 is fixed on base plate 20. Therefore, end plate 3 is provided with vertically extending locking holes 7 that each pass vertically through end plate 3. Fixing bolt 5 is inserted into each of locking holes 7 to assume a vertical position when fixing end plate 3 to base plate 20. The leading end of threaded part 5B of fixing bolt 5 is screwed into nut 21 which is a fixed part provided outwardly of base plate 20, thus fixing end plate 3 to base plate 20. Nut 21 is fixed to base plate 20 by welding or in an engagement structure so as not to rotate. However, for a base plate which is a thick metal plate, the base plate may be provided with a female threaded hole, and the leading end of the threaded part may be screwed into the female threaded hole to be fixed.

Each end plate 3 experiences, at its inner surface, cell reaction force that is caused by expansion of prismatic battery cells 1. End plates 3 apply the pressure to battery stack 2 to immobilize battery stack 2, so that end plates 3 experience the great cell reaction force when prismatic battery cells 1 expand. In order to immobilize prismatic battery cells 1 while applying the pressure to prismatic battery cells 1, end plates 3 disposed respectively at ends of battery stack 2 are connected to bind bars 4. Therefore, each of bind bars 4 is put under tension by the cell reaction force. Under the tension, bind bar 4 is deformed and stretches further, thus moving each of end plates 3. When end plate 3 is moved by the cell reaction force, fixing bolt 5 comes into contact with an inner surface defined by locking hole 7 and thus is acted upon by shear force. In order for end plate 3 to be in position without moving, battery module 10 is required to have tough fixing bolts 5 that do not get deformed by the shear force resulting from the cell reaction force. Therefore, fixing bolts 5 need to be considerably thick or need to be increased in number to fix one end plate 3.

Each of battery modules 10 illustrated in FIGS. 2 to 10 does not completely prevent fixing bolt 5 from being deformed by cell reaction force of battery stack 2 but allows fixing bolt 5 to be deformed to move end plate 3 in a direction that the cell reaction force acts. To enable this, each locking hole 7 of end plate 3 includes deformation space 8 for fixing bolt 5. Deformation space 8 is provided in locking hole 7 to allow deformation of fixing bolt 5 while end plate 3 moves by being acted upon by cell reaction force. Deformation space 8 is provided on a battery side of locking hole 7. This is because when end plate 3 is moved by the cell reaction force, battery-facing side 5b of threaded part 5B of fixing bolt 5 relatively gets close to battery cell 1 as illustrated in FIG. 11. While end plate 3 is moved by the cell reaction force in a direction indicated by arrow A, deformation space 8 reduces contact pressure between battery-facing side 5b of deforming threaded part 5B and the inner surface defined by locking hole 7. As the contact pressure between battery-facing side 5b of threaded part 5B and the inner surface defined by locking hole 7 increases, shear force increases at a boundary between threaded part 5B and base plate 20. This means that the shear force reduces when the contact pressure is reduced. While end plate 3 is moved with fixing bolt 5 being deformed by cell reaction force, battery module 10 distributes the cell reaction force to tension of bind bar 4 and frictional resistance between end plate 3 and base plate 20, thus causing reduced shear force to act on fixing bolt 5. In order for end plate 3 to be moved by great cell reaction force, deformation space 8 is provided in end plate 3 to allow deformation of fixing bolt 5. This is because when deformed by that cell reaction force, fixing bolt 5 moves end plate 3 in the direction that the cell reaction force acts.

If deformation space 8 has a large dimension, namely, large deformation clearance (d) between the inner surface defined by locking hole 7 and battery-facing side 5b of threaded part 5B, shear force that is caused by cell reaction force to act on fixing bolt 5 can be reduced. Taking into consideration strength of end plate 3, strength of bind bar 4, strength of fixing bolt 5, and maximum cell reaction force, deformation clearance (d) is set at an optimal value. This is because the shear force that acts on fixing bolt 5 varies with these parameters, and threaded part 5B experiences maximum deformation while end plate 3 is pressed by the maximum cell reaction force. The maximum deformation of threaded part 5B varies depending on, for example, the maximum cell reaction force, rigidity of end plate 3, rigidity of bind bar 4, and rigidity of fixing bolt 5; however, in a battery module that drives a traction motor of a vehicle, deformation clearance (d) is, for example, more than to or equal to 0.8 mm, is preferably more than or equal to 1 mm and is more preferably more than or equal to 1.2 mm. If deformation clearance (d) is set to cause, during the maximum cell reaction force, no contact between the inner surface defined by locking hole 7 and battery-facing side 5b of threaded part 5B, the shear force that acts on fixing bolt 5 can be a minimum. If deformation clearance (d) is set to achieve, during the maximum cell reaction force, a lower contact pressure between battery-facing side 5b of threaded part 5B and the inner surface defined by locking hole 7, the cell reaction force is distributed to the tension of bind bar 4, the frictional resistance between end plate 3 and base plate 20, and the shear force that acts on fixing bolt 5, so that the shear force that acts on fixing bolt 5 can be a specified value.

Figure 2:
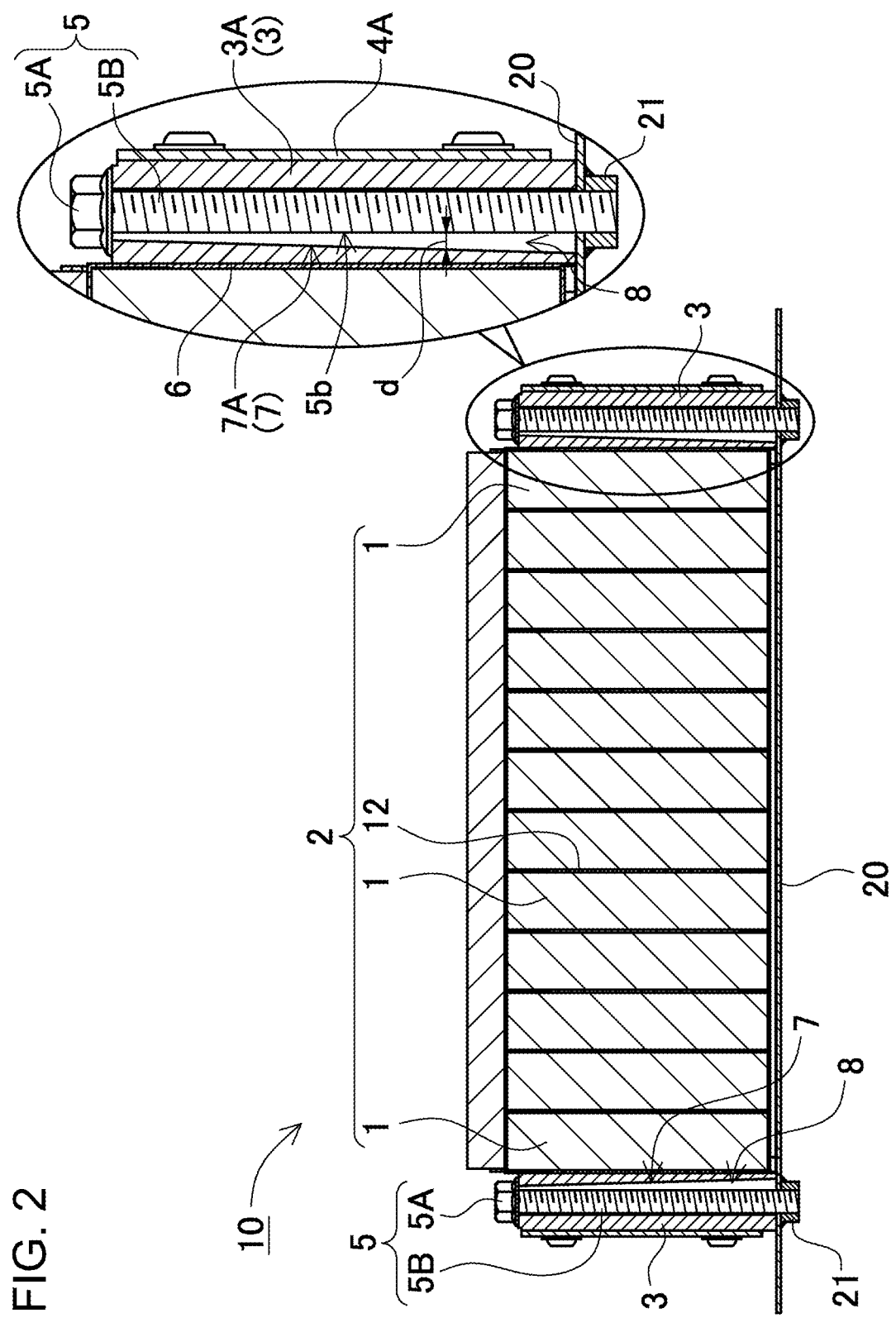
FIG. 2 is a sectional view of the battery module, the section being taken along line II-II in FIG. 1.

In each end plate 3A illustrated in FIG. 2, each of locking holes 7A flaringly increases in size heading toward a leading edge of threaded part 5B of fixing bolt 5 and includes, near the leading edge of fixing bolt 5, deformation space 8 that gradually increases in size. In this end plate 3A, deformation space 8 can be provided near the leading edge of threaded part 5B, with an inside diameter of locking hole 7A allowing insertion of a rear end of threaded part 5B and being substantially equal to an outside diameter of threaded part 5B. Therefore, with fixing bolt 5 inserted in locking hole 7A and being connected in position (without being out of position) in end plate 3A, contact pressure can be reduced between threaded part 5B and an inner surface defined by locking hole 7A while end plate 3A is moved by cell reaction force. Threaded part 5B has a leading end fixed to base plate 20, and the rear end connected to end plate 3A, so that when end plate 3A is moved by the cell reaction force, the rear end of threaded part 5B moves with end plate 3A, with the leading end of threaded part 5B being fixed in base plate 20. Therefore, as FIG. 11 illustrates, threaded part 5B is deformed by the cell reaction force with its rear end moving with end plate 3A in a direction indicated by arrow B. While threaded part 5B is deformed with its rear end moving in the direction of arrow B, the leading end of threaded part 5B gets close to the inner surface defined by locking hole 7A. Because locking hole 7A that flaringly increases in size heading toward the leading edge of threaded part 5B includes deformation space 8 near the leading edge of threaded part 5B, contact pressure that is caused when the leading end of threaded part 5B gets close to or hits against the inner surface defined by locking hole 7A is reduced. Accordingly, shear force can be reduced at a boundary between threaded part 5B and base plate 20.

Figure 3:
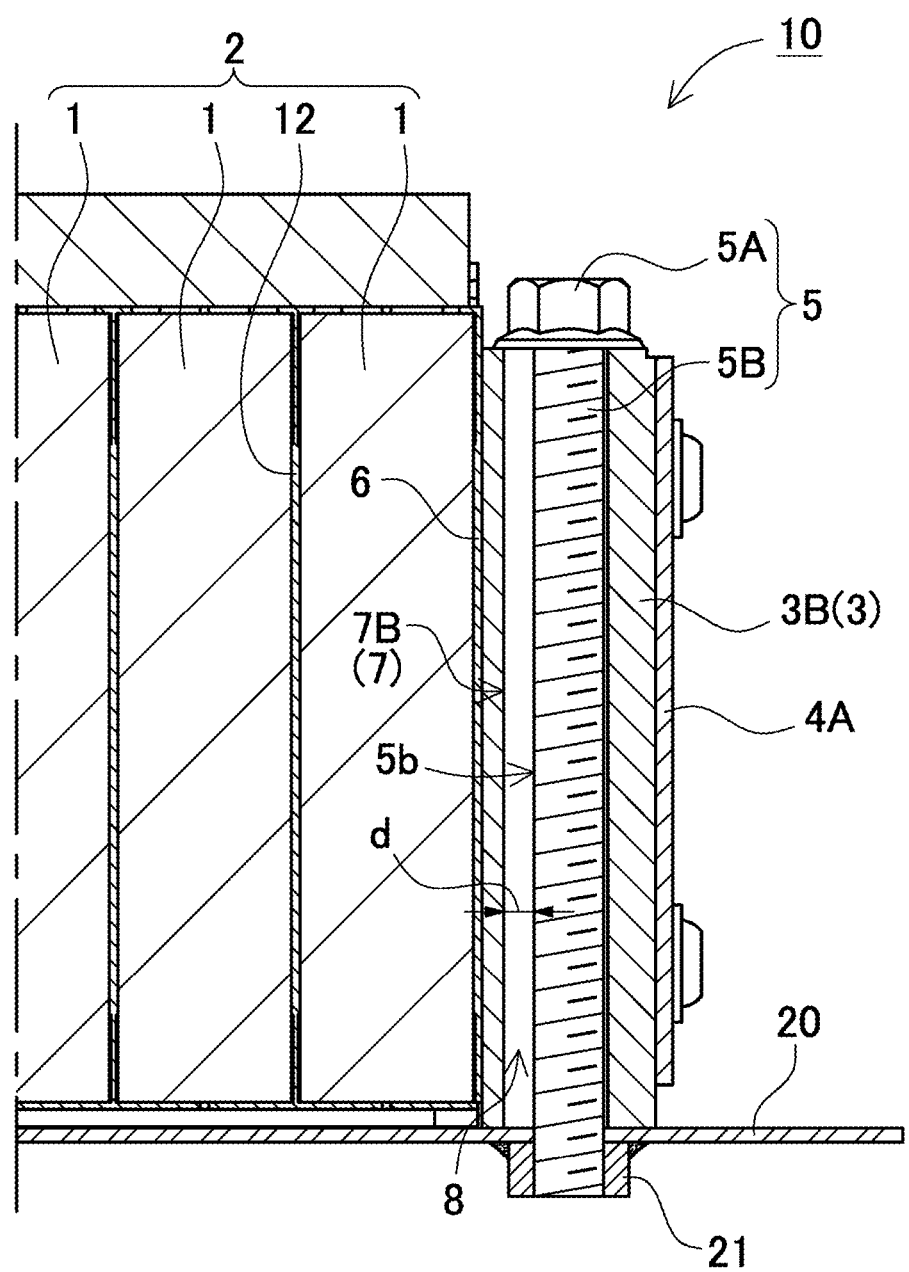
FIG. 3 is a sectional view of a battery module according to another exemplary embodiment of the present invention.

In end plate 3B illustrated in section by FIG. 3, locking hole 7B has an inside shape that is a long hole slender in a stacked direction of battery stack 2, and includes deformation space 8 on a battery side of fixing bolt 5. Deformation space 8 can be larger with end plate 3B not having decreased strength because of locking hole 7B that is not enlarged along a width of this end plate 3B. In order to have larger deformation clearance (d) on its battery side, locking hole 7B, which is the long hole, has inserted fixing bolt 5 on its other side. If the long hole has inserted fixing bolt 5 in its center, a deformation space is formed on each side of threaded part 5B, that is to say, on the battery side as well as on the counter battery side of threaded part 5B. When fixing bolt 5 is inserted to be positioned on the side opposite from the battery side, deformation space 8 can be provided only on the battery side of threaded part 5B and thus can have larger deformation clearance (d). Because end plate 3B fixed in this condition can have larger deformation space 8 on the battery side, deformation space 8 can have larger deformation clearance (d) with the long hole having a shorter major axis.

Figure 4:
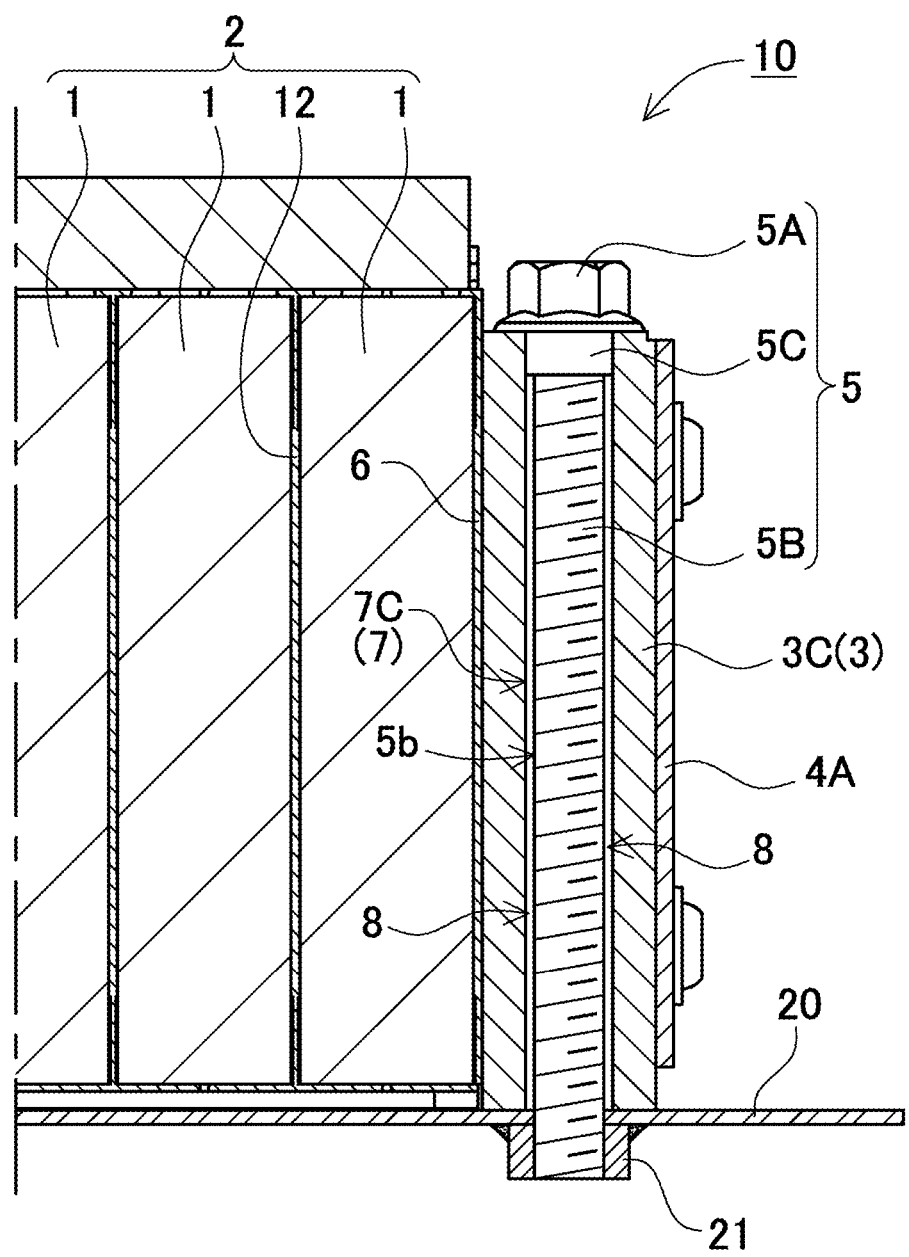
FIG. 4 is a sectional view of a battery module according to yet another exemplary embodiment of the present invention.

In end plate 3C illustrated in section by FIG. 4, locking hole 7C throughout has an inside diameter that is larger than an outside diameter of threaded part 5B of fixing bolt 5 and includes deformation space 8 around threaded part 5B. Moreover, fixing bolt 5 includes, near its rear edge, engagement part 5C of an outside diameter that engages or fits in locking hole 7C. With engagement part 5C engaging in locking hole 7C, deformation space 8 is provided near a leading edge of threaded part 5B of fixing bolt 5. In above end plate 3C, the inside diameter of locking hole 7C is substantially equal to, that is to say, slightly larger than the outside diameter of engagement part 5C, so that when inserted in locking hole 7C, engagement part 5C enables fixing bolt 5 to be positioned precisely (so as not to be out of position) in locking hole 7C. This battery module 10 has engagement part 5C inserted in locking hole 7C to enable fixing bolt 5 to be disposed in position (so as not to be out of position) in end plate 3C and enables deformation space 8 to be provided in a leading end of locking hole 7C. Thus threaded part 5B can be disposed in deformation space 8 to be elastically deformed without fail by cell reaction force.

Figure 5:
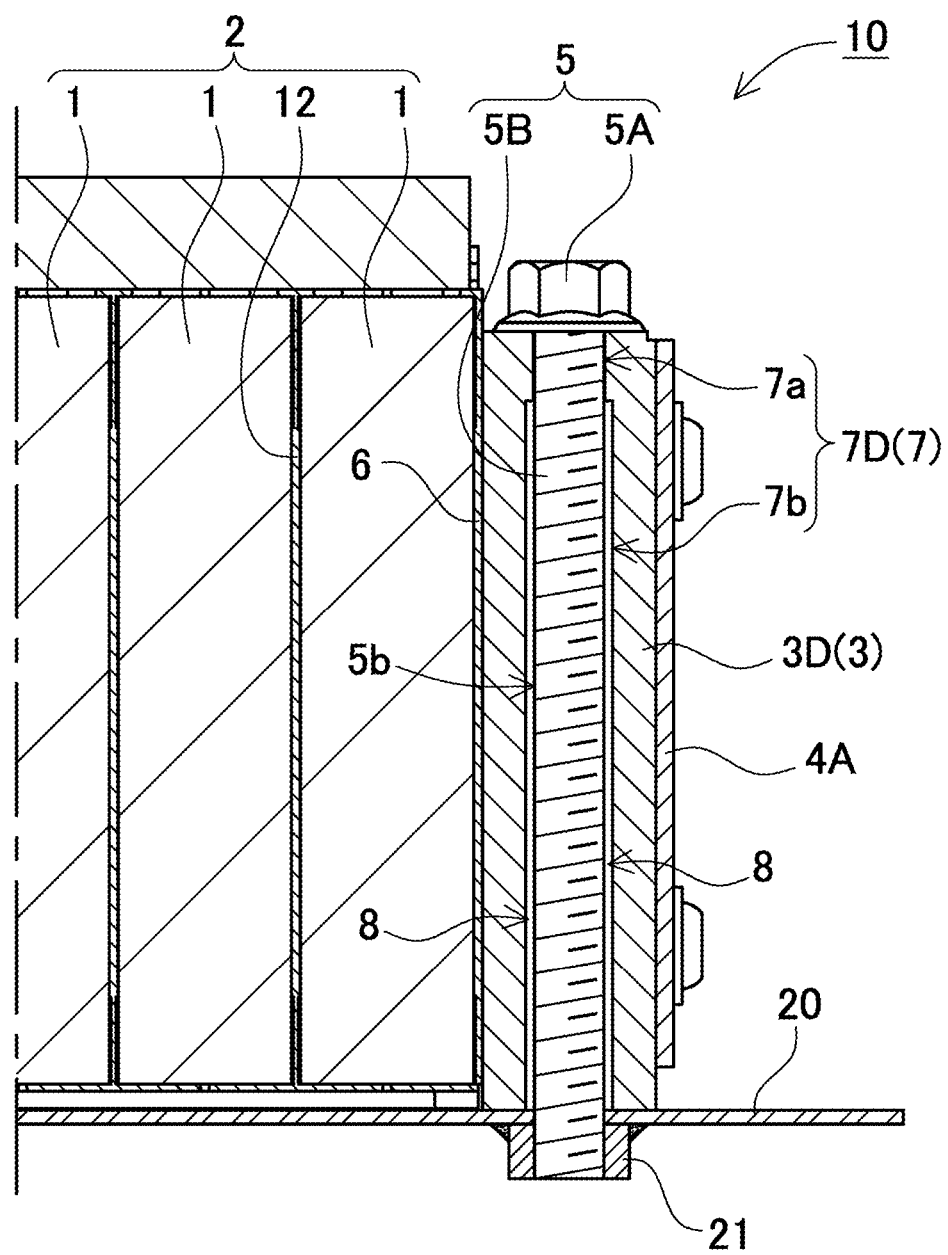
FIG. 5 is a sectional view of a battery module according to still yet another exemplary embodiment of the present invention.

In end plate 3D illustrated in section by FIG. 5, locking hole 7D provided includes small diameter part 7a that allows insertion of a rear end of threaded part 5B, and larger diameter part 7b that has a larger inside diameter than small diameter part 7a and allows insertion of a leading end of threaded part 5B. Threaded part 5B is inserted into position in small diameter part 7a of this locking hole 7D. In larger diameter part 7b, deformation space 8 is provided around threaded part 5B. In above end plate 3D, the inside diameter of small diameter part 7a is substantially equal to, that is to say, slightly larger than an outside diameter of threaded part 5B, so that fixing bolt 5 is positioned precisely (so as not to be out of position) in locking hole 7D. In this end plate 3D, fixing bolt 5 can be disposed into position (so as not to be out of position) in end plate 3D when inserted in locking hole 7D, and deformation space 8 can be provided in larger diameter part 7b that is a leading end of locking hole 7D. This battery module 10 can have deformation space 8 provided in locking hole 7D without using a bolt of special shape as fixing bolt 5.

Figure 6:
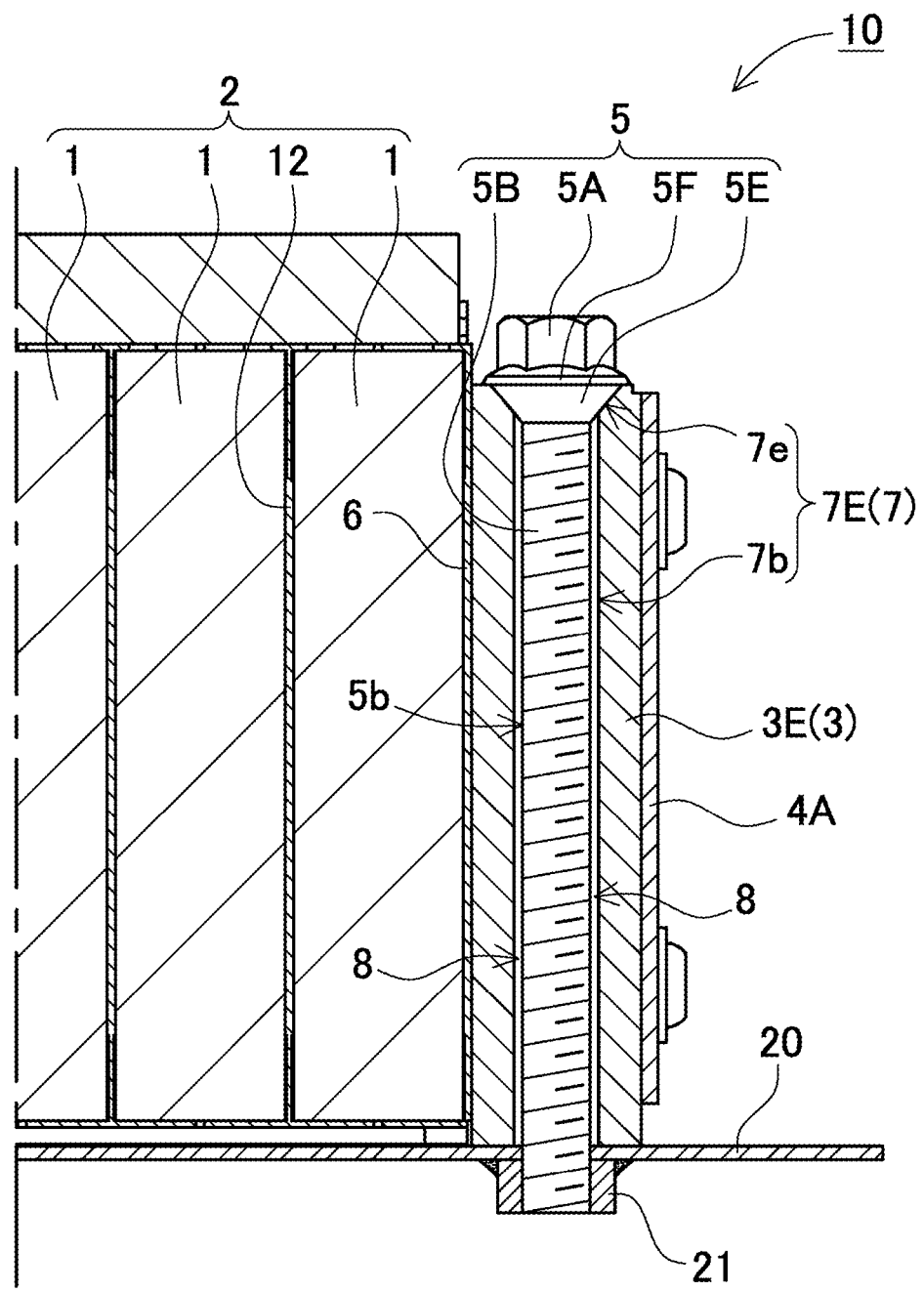
FIG. 6 is a sectional view of a battery module according to still yet another exemplary embodiment of the present invention.

In end plate 3E illustrated in section by FIG. 6, locking hole 7E has an inside diameter that is larger than an outside diameter of threaded part 5B of fixing bolt 5 and includes deformation space 8 around threaded part 5B. In this end plate 3E, locking hole 7E also includes, at its opening, flaringly expanding part 7e so that fixing bolt 5 is inserted into a fixed position. In other words, illustrated locking hole 7E includes larger diameter part 7b of a large inside diameter that allows insertion of a leading end of threaded part 5B, and flaringly expanding part 7e at its upper opening. Flaringly expanding part 7e flaringly increases in size heading toward the opening of locking hole 7E. Fixing bolt 5 includes flaring insert 5E guided in flaringly expanding part 7e of locking hole 7E. In FIG. 6, fixing bolt 5 also includes flange 5F between screw head 5A and insert 5E. This fixing bolt 5 is screwed until flange 5F is closely fitted to an upper face of end plate 3E, and flaring insert 5E is fitted in flaringly expanding part 7e. In this structure, end plate 3E is firmly fixed to base plate 20 with flange 5F pressed against the upper face of end plate 3E at its larger area. With flaring insert 5E fitting in flaringly expanding part 7e, fixing bolt 5 is exactly concentric with locking hole 7E, so that deformation space 8 can be provided between fixing bolt 5 and locking hole 7E.

Figure 7:
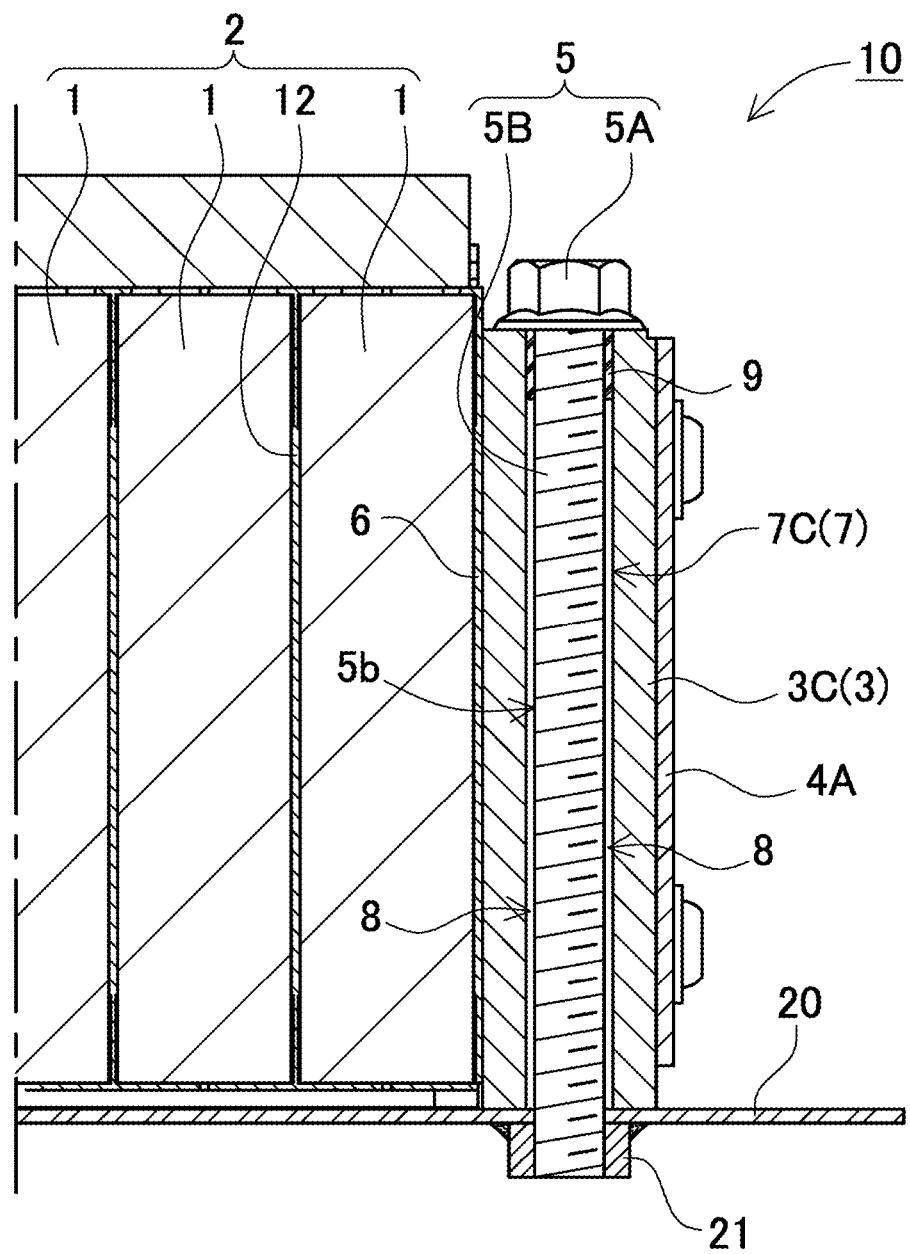
FIG. 7 is a sectional view of a battery module according to still yet another exemplary embodiment of the present invention.
Figure 8:
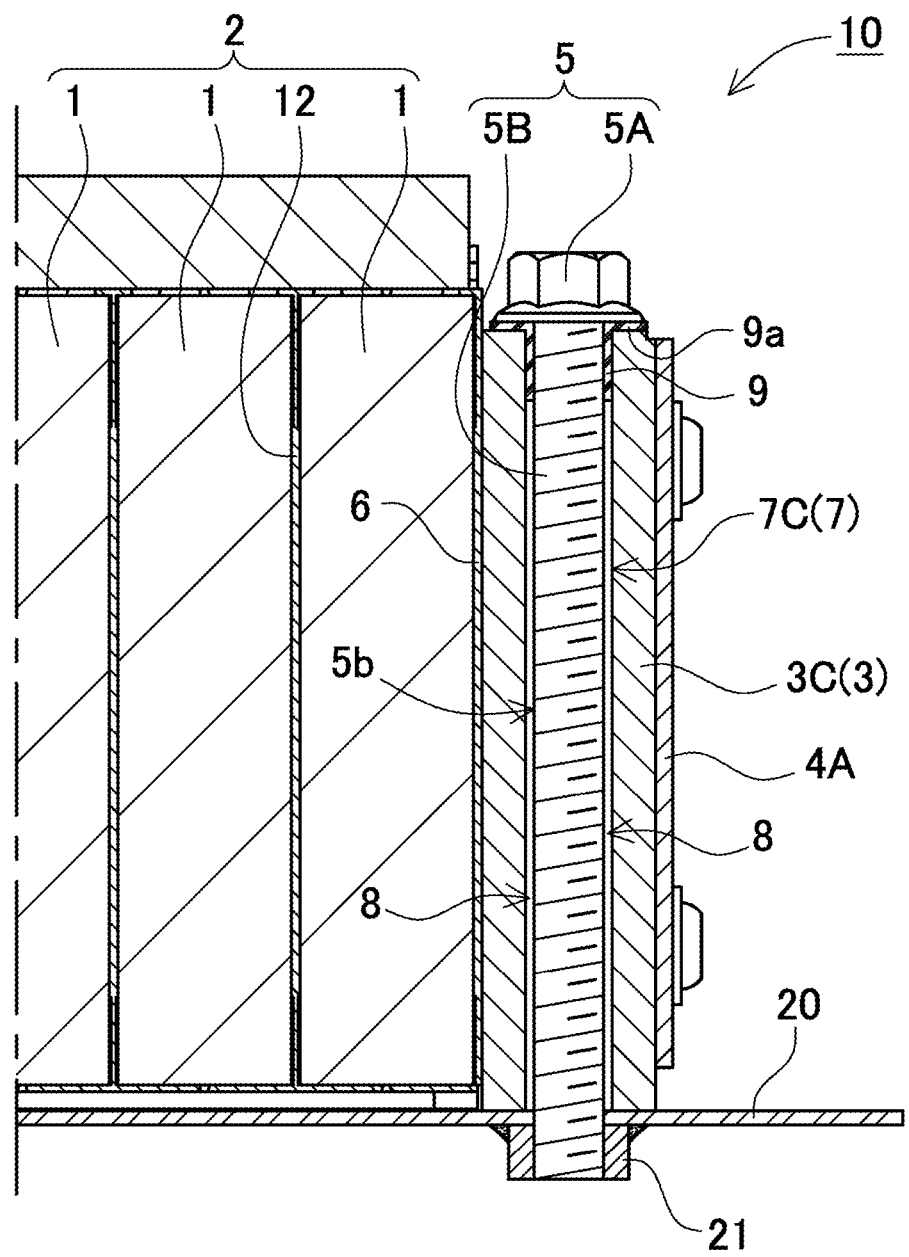
FIG. 8 is a sectional view of a battery module according to still yet another exemplary embodiment of the present invention.

In end plate 3C illustrated in section by FIG. 7, locking hole 7C throughout has an inside diameter that is larger than an outside diameter of threaded part 5B of fixing bolt 5, and deformation space 8 is provided between locking hole 7C and threaded part 5B. In this end plate 3C, deformation space 8 provided between threaded part 5B and locking hole 7C partly includes collar 9 inserted so that fixing bolt 5 is disposed in a center of locking hole 7C. Collar 9 has a center hole allowing insertion of threaded part 5B of fixing bolt 5. Inserted collar 9 is positioned around a rear end of threaded part 5B, so that deformation space 8 does not have collar 9 between a leading end of threaded part 5B and locking hole 7C. Characteristically, this battery module 10 enables fixing bolt 5 to be inserted into position (without being out of position) in end plate 3C by means of collar 9 and can reduce shear force that is caused by cell reaction force to act on fixing bolt 5. In a structure illustrated in section by FIG. 8, flange 9a is provided integrally with collar 9. With fixing bolt 5 tightened to base plate 20, flange 9a is closely fitted to an upper side of end plate 3C, and collar 9 is in position in locking hole 7C.

Figure 9:
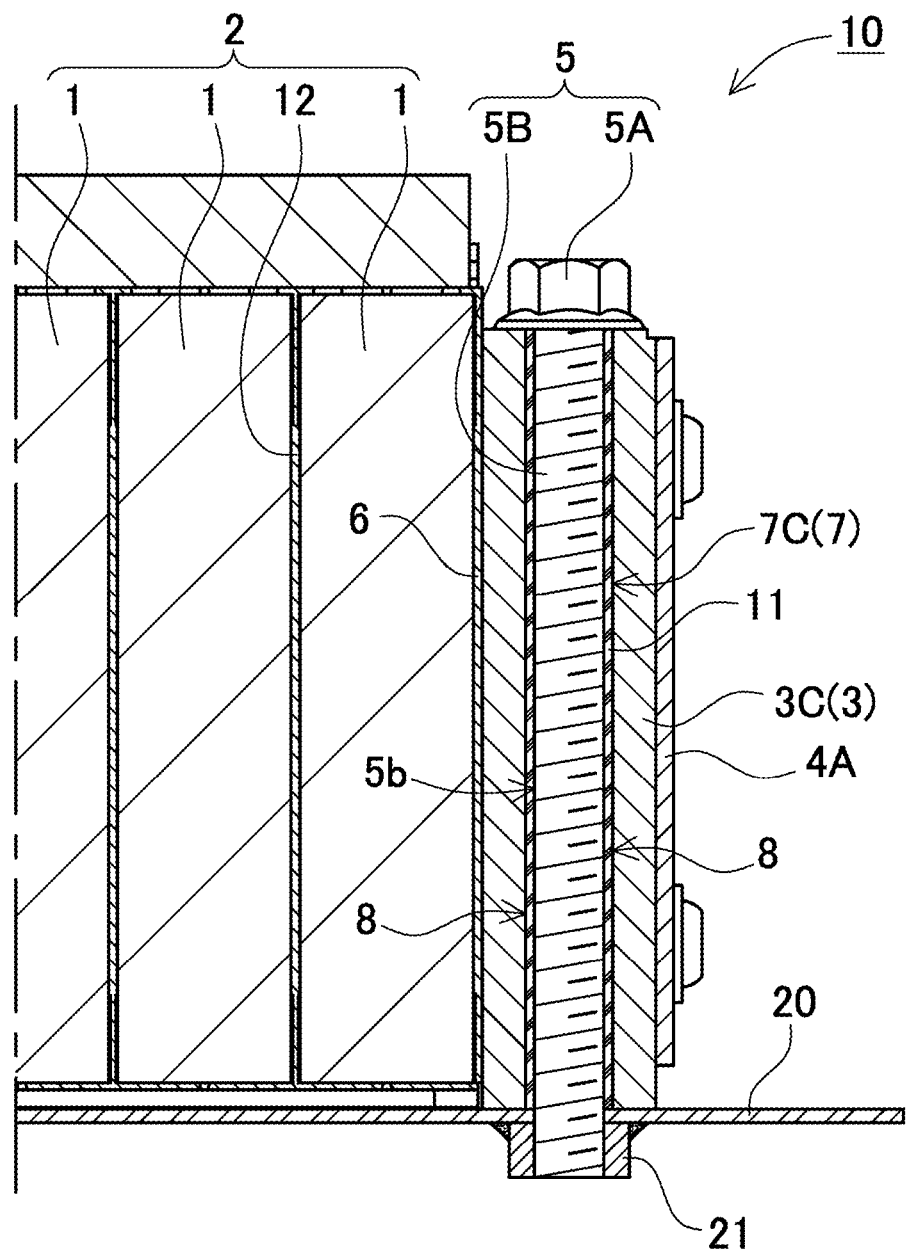
FIG. 9 is a sectional view of a battery module according to still yet another exemplary embodiment of the present invention.

In end plate 3C illustrated in section by FIG. 9, locking hole 7C has an inside diameter that is larger than an outside diameter of threaded part 5B of fixing bolt 5, and deformation space 8 is provided between locking hole 7C and threaded part 5B. This deformation space 8 includes flexible ring 11 inserted. Flexible ring 11 is flexible enough to deform on being pressed by threaded part 5B that is deformed by cell reaction force. This flexible ring 11 inserted in locking hole 7C has an outside diameter that is substantially equal to the inside diameter of locking hole 7C, and an inside diameter that is substantially equal to the outside diameter of threaded part 5B to allow insertion of threaded part 5B. Therefore, locking hole 7C and threaded part 5B of fixing bolt 5 are concentric with each other. Flexible ring 11 is made of a flexible plastic or a rubbery elastic material so as to deform on being pressed by threaded part 5B that is deformed. In the structure including flexible ring 11 inserted in locking hole 7C, flexible ring 11 deforms on being pressed by threaded part 5B that is deformed. Therefore, flexible ring 11 inserted has a length that is equal to an overall length of locking hole 7C and thus can occupy entire deformation space 8 provided between threaded part 5B and locking hole 7C. However, the length of the flexible ring may be shorter than the overall length of the locking hole to occupy only an upper part of the locking hole.

Figure 10:
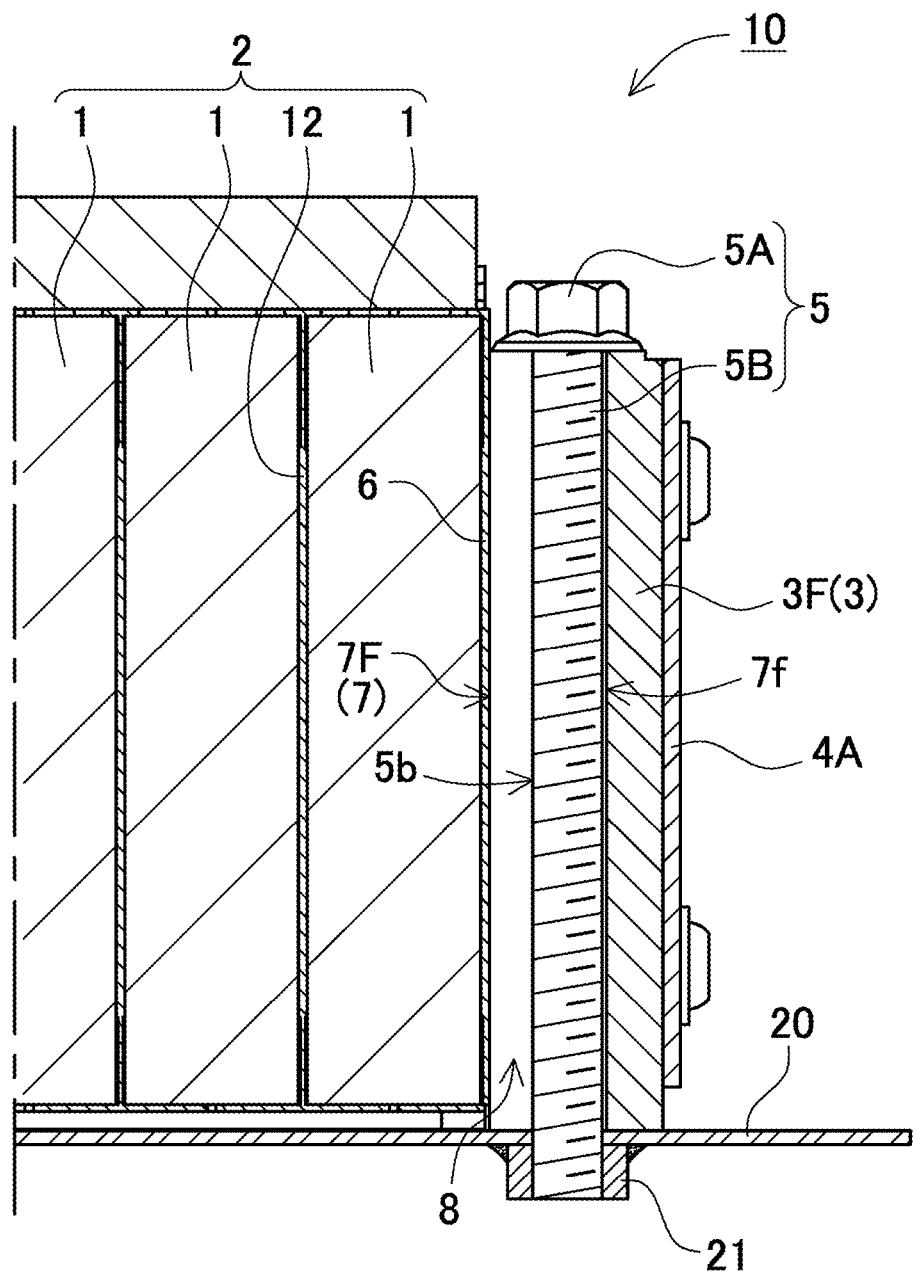
FIG. 10 is a sectional view of a battery module according to still yet another exemplary embodiment of the present invention.
Figure 11:
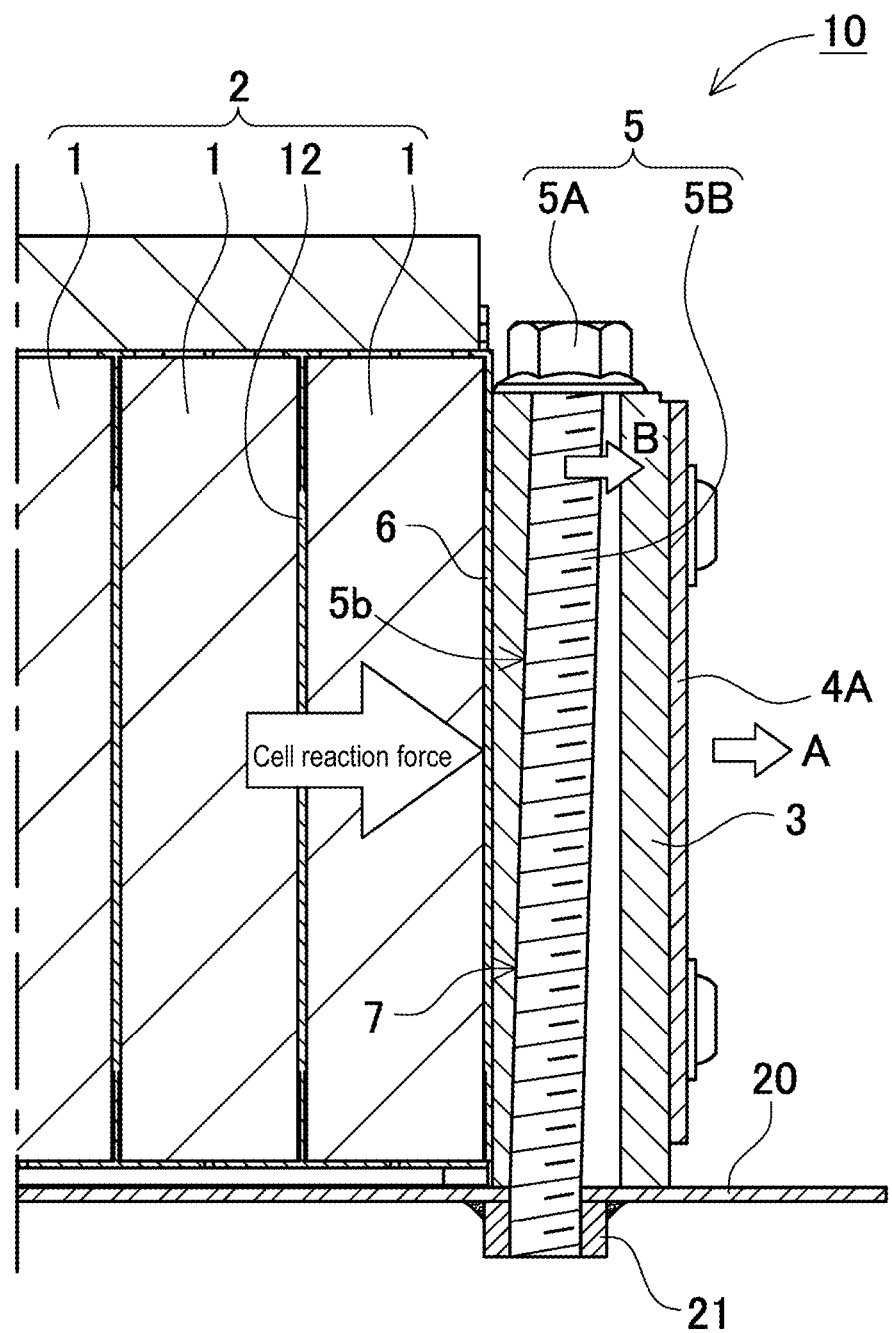
FIG. 11 is an enlarged sectional view illustrating the FIG. 2 battery module experiencing cell reaction force.

In end plate 3F illustrated in section by FIG. 10, locking hole 7F is groove-shaped. Groove-shaped locking hole 7F has a battery-side opening and includes deformation space 8 on a battery side of threaded part 5B. Insulator 6 is disposed between illustrated end plate 3F and battery stack 2, thus providing insulation between threaded part 5B of fixing bolt 5 and prismatic battery cell 1. In this battery module 10, fixing bolt 5 is disposed at groove bottom 7f of groove-shaped locking hole 7F to fix end plate 3 to base plate 20. Deformation space 8 is provided between insulator 6 and threaded part 5B of fixing bolt 5 disposed at groove bottom 7f.

Each of bind bars 4 is connected to end plates 3 at its ends for binding battery stack 2 with the pressure being applied to battery stack 2. In FIG. 1, each bind bar 4 has bent pieces 4A made by bending ends of a metal plate inward, and each of these bent pieces 4A is screwed to end plate 3. Bind bar 4 illustrated in FIG. 1 also includes an upper and a lower ends that are inwardly bent to serve as holding parts 4B that pinch an upper and a lower surface of battery stack 2 to hold prismatic battery cells 1 in position. Each bind bar 4 pinches, via end plates 3, the end faces of battery stack 2 that is a stack of prismatic battery cells 1 and spacers 12.

While being mounted on an upper surface of base plate 20, each of above-described battery modules 10 is fixed in place to base plate 20 with each fixing bolt 5 passed through end plate 3 and screwed into base plate 20. Base plate 20 is a plate to which battery module 10 is fixed. In an example in which battery module 10 is mounted to a vehicle, base plate 20 may be a frame that is fixed to the vehicle, such as a chassis. The battery module mounted to the vehicle has each fixing bolt 5 inserted through locking hole 7 of end plate 3 with the leading end of fixing bolt 5 screwed into a female threaded hole of the chassis. In this way, the battery module is fixed to the chassis of the vehicle. Fixing bolts 5 firmly fix end plates 3 to the chassis. This structure in which fixing bolts 5 are passed through end plates 3 and are fixed directly to chassis 92 of the vehicle as illustrated in FIGS. 12 and 13 enables battery module 10 to be very firmly fixed to the vehicle.

(Vehicle Including Battery Module)

Each of the above-described battery modules is best used as a power source that supplies electric power to a motor which drives an electrically driven vehicle. Available examples of the electrically driven vehicle mounted with the battery module include a hybrid or a plug-in hybrid vehicle that is driven both by an engine and by a motor, and an electric vehicle that is driven only by a motor. The battery module is used as the power source in each of these vehicles. In order to provide electric power that drives the vehicle, a large-capacity, high-output power supply device may be mounted and may include a plurality of the above-described battery modules that are connected in series or parallel, and a control circuit that is a necessary addition.

Figure 12:
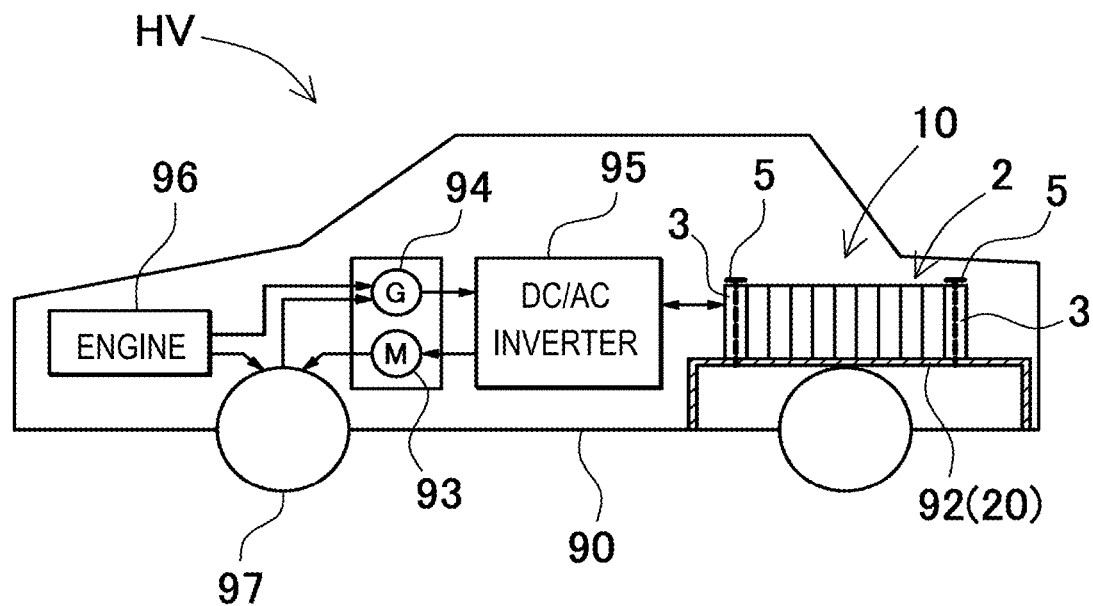
FIG. 12 is a block diagram illustrating an example in which the battery module is mounted to a hybrid vehicle that is driven by an engine and a motor.
Figure 13:
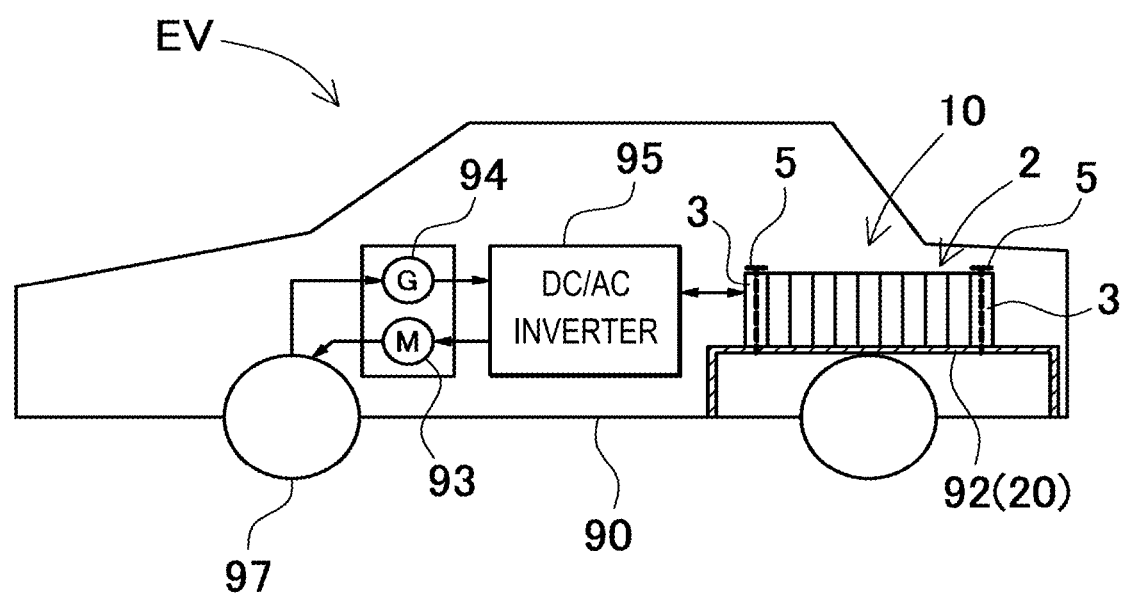
FIG. 13 is a block diagram illustrating an example in which the battery module is mounted to an electric vehicle that is driven only by a motor.

FIG. 12 illustrates an example in which the battery module is mounted to a hybrid vehicle that is driven both by an engine and by a motor. Illustrated vehicle HV mounted with the battery module includes engine 96 and traction motor 93 that cause vehicle HV to run, battery module 10 that supplies electric power to motor 93, electric generator 94 that charges those battery cells of battery module 10, vehicle body 90 mounted with engine 96, motor 93, battery module 10, and electric generator 94, and wheels 97 that are driven by engine 96 or motor 93 to run vehicle body 90. Battery module 10 is connected to motor 93 and electric generator 94 via direct current to alternating current (DC-AC) inverter 95. Vehicle HV is driven both by motor 93 and by engine 96 while the prismatic battery cells of battery module 10 charge and discharge. Motor 93 is driven to drive the vehicle when engine efficiency is low, for example, during acceleration or on a low speed run. Motor 93 is driven when electric power is supplied from battery module 10. Electric generator 94 is driven by engine 96 or by regenerative braking that is caused when the vehicle brakes, thus charging the battery cells of battery module 10.

FIG. 13 illustrates an example in which the battery module is mounted to an electric vehicle that is driven only by a motor. Illustrated vehicle EV mounted with the battery module includes traction motor 93 that causes vehicle EV to run, battery module 10 that supplies electric power to motor 93, electric generator 94 that charges those prismatic battery cells of battery module 10, vehicle body 90 mounted with motor 93, battery module 10, and electric generator 94, and wheels 97 that are driven by motor 93 to run vehicle body 90. Battery module 10 is connected to motor 93 and electric generator 94 via DC-AC inverter 95. Motor 93 is driven when electric power is supplied from battery module 10. Electric generator 94 is driven by energy caused during regenerative braking of vehicle EV and charges the prismatic battery cells of battery module 10.

INDUSTRIAL APPLICABILITY

A battery module according to the present invention can be suitably used in a power supply device for a hybrid vehicle, a plug-in hybrid vehicle, an electric vehicle, or the like.

The invention claimed is:

1. A battery module comprising:
   a battery stack that includes a plurality of prismatic battery cells stacked in a direction along thicknesses of the plurality of prismatic battery cells;
   a pair of end plates disposed respectively at end faces of the battery stack that face in a stacked direction;
   a bind bar connecting the pair of end plates; and
   a fixing bolt fixing each of the pair of end plates to a base plate,
   wherein
   at least one of the end plates includes a locking hole for the fixing bolt, the locking hole extending along a surface of the at least one of the end plates,
   the locking hole includes, on a battery side of the locking hole, a deformation space that allows deformation of the fixing bolt when cell reaction force of the battery stack is caused, and
   the fixing bolt extends across an entire length of the locking hole in a direction parallel to a principal surface of the end plate.

2. The battery module according to claim 1, wherein:
   the locking hole of the at least one of the end plates flaringly increases in size heading toward a leading edge of the fixing bolt; and
   the deformation space is provided near the leading edge of the fixing bolt.

3. The battery module according to claim 1, wherein:
   the locking hole of the at least one of the end plates is a hole that is elongated along the stacked direction of the battery stack; and
   the deformation space is provided on a battery side of the fixing bolt.

4. The battery module according to claim 1, wherein:
   the locking hole has an inside diameter that is larger than an outside diameter of a threaded part of the fixing bolt;
   the fixing bolt includes, near a rear edge of the fixing bolt, an engagement part of an outside diameter that engages in the locking hole; and
   with the engagement part engaging in the locking hole, the deformation space is provided near a leading edge of the fixing bolt.

5. The battery module according to claim 1, wherein:
   the locking hole includes:
   a small diameter part allowing insertion of a rear end of the fixing bolt; and
   a larger diameter part allowing insertion of a leading end of the fixing bolt, and having a diameter larger than a diameter of the small diameter part; and
   the larger diameter part includes the deformation space.

6. The battery module according to claim 1, wherein:
   the locking hole has an inside diameter that is larger than an outside diameter of a threaded part of the fixing bolt;
   the locking hole further includes a flaringly expanding part that increases in size heading toward an opening of the locking hole;
   the fixing bolt includes a flaring insert guided in the flaringly expanding part; and
   the fixing bolt is inserted into a fixed position in the locking hole with the flaring insert guided in the flaringly expanding part.

7. The battery module according to claim 1, wherein:
   the locking hole has an inside shape that is larger than an outside shape of a threaded part of the fixing bolt;
   the deformation space is provided between the locking hole and the threaded part;
   the deformation space partly includes a collar inserted; and
   the collar includes a center hole allowing insertion of a threaded part of the fixing bolt.

8. The battery module according to claim 1, wherein:
   the locking hole has an inside shape that is larger than an outside shape of a threaded part of the fixing bolt;
   the deformation space is provided between the locking hole and the threaded part; and
   the deformation space includes a flexible ring that is inserted and is flexible enough to deform on being pressed by a threaded part that is deformed.

9. The battery module according to claim 1, wherein the locking hole is groove-shaped, has a battery-side opening and includes the deformation space on a battery side of a threaded part of a fixing bolt.

10. The battery module according to claim 1, wherein the deformation space is provided between the locking hole and the threaded part that are included in the at least one of the end plates.

11. A vehicle comprising the battery module according to claim 1, wherein:
    the base plate is a vehicle chassis; and
    the at least one of the end plates is fixed to the vehicle chassis by the fixing bolt.

* * * * *